(12) United States Patent
Langley et al.

(10) Patent No.: US 7,077,020 B2
(45) Date of Patent: Jul. 18, 2006

(54) INTERNAL FIELD JOINT INSPECTION ROBOT

(75) Inventors: Russell M. Langley, Tulsa, OK (US); Jarod D. Carmichael, Tulsa, OK (US); David Paulley, Tulsa, OK (US); Charles F. Haworth, Tulsa, OK (US); John D. Carter, Tulsa, OK (US); James A. Huggins, Tulsa, OK (US); Keith Roberts, Tulsa, OK (US)

(73) Assignee: CRTS, Inc., Tulsa, OK (US)

( * ) Notice: Subject to any disclaimer, the term of this patent is extended or adjusted under 35 U.S.C. 154(b) by 156 days.

(21) Appl. No.: 10/813,835

(22) Filed: Apr. 1, 2004

(65) Prior Publication Data

US 2005/0217394 A1  Oct. 6, 2005

(51) Int. Cl.
*G01M 19/00* (2006.01)
*B05C 11/00* (2006.01)

(52) U.S. Cl. .................................... 73/865.8; 118/669

(58) Field of Classification Search ................. 33/834; 73/49.5, 865.8; 118/669
See application file for complete search history.

(56) References Cited

U.S. PATENT DOCUMENTS

| | | | | |
|---|---|---|---|---|
| 2,791,198 A | * | 5/1957 | Cummings | 118/69 |
| 3,039,428 A | * | 6/1962 | McLean | 118/69 |
| 4,539,847 A | * | 9/1985 | Paap | 73/579 |
| 4,722,142 A | * | 2/1988 | Schmidt | 33/834 |
| 5,947,051 A | * | 9/1999 | Geiger | 114/313 |
| 6,474,165 B1 | * | 11/2002 | Harper et al. | 73/623 |
| 6,916,502 B1 | * | 7/2005 | Moore et al. | 427/236 |

OTHER PUBLICATIONS

Definition of "record" from Merriam-Webster Online Dictionary, http://www.m-w.com.*

* cited by examiner

*Primary Examiner*—Charles Garber
(74) *Attorney, Agent, or Firm*—William S. Dorman (57) ABSTRACT

An inspection robot is provided to traverse the interior of a pipeline for the purpose of checking the coating at the interior surface of the pipeline at the weld seams. The robot is designed to determine the thickness of the coatings and to provide a visual and recordable reading thereof. The robot is provided with a holiday detector in the form of a conductive brush mounted on a rotatable hub and adapted to sweep against the weld seam so as to locate any voids in the coating by means of electrical conductance, thus causing a holiday marker to activate and mark the pipeline interior surface so that the site can be revisited for repair. The robot is further provided with a mil gauge probe mounted on a slidable plunger attached to the rotatable hub for measuring coating thickness on the weld seam and for providing data via a digital mil gauge readout; the conductive brush, the slidable plunger for mil gauge probe, the digital mil gauge readout, and the forward portion of the robot being all provided with cameras which simultaneously record the movements and data encountered by the inspection robot to provide real-time feedback to a remote operator.

5 Claims, 6 Drawing Sheets

INTERNAL FIELD JOINT INSPECTION ROBOT

BACKGROUND OF THE INVENTION

1. Field of the Invention

The present invention relates to a field joint inspection robot which can be moved or driven through a pipeline and positioned therein by means of a commercially available internal pipe crawler device while being simultaneously monitored by a remote operator. More particularly, the present invention relates to a field joint inspection robot designed to travel along the interior of a pipeline for the purpose of inspecting the integrity of coatings applied to the interior surface area at the welded joint of the pipeline. The present invention is further designed to inspect the integrity of coatings applied to a metal substrate located anywhere within the interior of the pipeline using an onboard thickness gauge to record applied coating thickness, detect for holidays (voids or pinholes) in the coating, mark the location of any detected holiday, and provide simultaneous live video feedback to a device operator.

2. The Prior Art

There are a number of patents that show or relate to robots designed to travel within the confines of a pipeline.

A preliminary patentability search was conducted on this invention and the following listed references were uncovered in the search:

| Inventor | Issue Date | Patent No. |
| --- | --- | --- |
| CRC-EVANS Pipeline | Nov. 12, 1996 | EP 0 747 693 A2 |
| O'Conner et al. | Feb. 8, 1983 | 4,372,658 |
| Clarke et al. | Feb. 28, 1984 | 4,434,427 |
| Moyer et al. | Jun. 23, 1987 | 4,675,604 |
| Pfisterer et al. | Nov. 14, 1989 | 4,881,031 |
| Hapstack et al. | Feb. 15, 1994 | 5,282,689 |
| Fowler et al. | Jul. 16, 1996 | 5,536,035 |
| Wernicke | Oct. 15, 1996 | 5,565,633 |
| Smalser, Sr. | May 19, 1998 | 5,754,220 |
| Laursen | Jan. 26, 1999 | 5,864,232 |
| Ramaut | Aug. 8, 2000 | 6,100,684 |
| Jacobs et al. | May 15, 2001 | 6,232,773 B1 |
| Tuck et al. | Jun. 5, 2001 | 6,243,657 B1 |
| Olsson et al. | Apr. 8, 2003 | 6,545,704 B1 |
| Ghorbel et al. | May 15, 2003 | 2003/0089267 A1 |

The above patent references are not believed to disclose the present invention.

U.S. Pat. No. 4,881,031 is a device used to check for defects in the metal substrate using magnetic flux detectors.

U.S. Pat. No. 5,565,633 is a differential pressure style pig designed to spiral as it progresses down a pipeline thus sweeping sensors over the surface in a determined pattern to check for defects in the metal substrate and determine the location of welded joints as it passes.

U.S. Pat. No. 6,100,684 is a helically traveling device used to check the metal substrate. This device could detect the present of a welded joint as it passes.

U.S. Pat. No. 4,434,427 provides a passive atmosphere within the cavity between pig seals inside a pipeline for photographic pipeline inspection.

U.S. Pat. No. 4,372,658 is a pipeline inspection apparatus utilizing a differential pressure style pig with onboard camera. The onboard camera records only that which the pig positions the camera to view, and the recorded image must be recovered from camera film or memory subsequent to the return of the pig from the pipeline.

U.S. Pat. No. 5,285,689 is an inspection carriage with precise and repeatable position control and location determination which uses both clock and linear positioning in conjunction with an operating platform for an eddy current sensor and ultrasonic sensor device which instruments may be positioned within a pipeline.

U.S. Pat. No. 6,545,704 is an optical method for measuring the distance a push cable has been inserted into a pipeline.

Patent No. 20030089267A1 discloses a flow stream propelled device having a platform from which a variety of sensors and tools may be deployed.

U.S. Pat. No. 5,864,232 uses a magnetic flux inspection device to detect cracks and corrosion in metal substrate.

U.S. Pat. No. 6,232,773 allows constant forces to be applied to a pipe surface via brushes.

U.S. Pat. No. 6,243,657 B1 discloses a pig with an inertial reference system designed to detect corrosion, cracks, and weld defects and locate these defects by reference within the pipeline.

U.S. Pat. No. 5,754,220 uses a push cable to insert a television camera or sensor into a pipeline interior.

U.S. Pat. No. 5,537,035 is a magnetic flux sensor designed to detect anomalies in metal substrate.

U.S. Pat. No. 4,675,604 is a device for detecting defects in metal substrate using magnetic flux leakage sensors.

Patent No. EP 0747693A2 is a visual inspection apparatus utilizing a mirror to view the interior circumference of a pipe and the weld areas where the pipeline is joined.

SUMMARY OF THE INVENTION

Pipelines are constructed from individual metallic pipes (sections) which are laid individually end to end and then connected to one another by means of a welded seam. The individual pipes are generally coated at a plant on their respective interiors to prevent corrosion when liquid or gaseous substances pass through the pipeline. However, the pipe seams, which are formed by welding the ends of the individual pipes together in the field to form the pipeline, are not coated. Therefore, when the welding process has been completed, each field joint, also referred to herein as a weld seam, must be coated in the field from the interior to prevent corrosion at the field joint or weld seam. A machine for coating the weld seams following the seam welding process is disclosed in U.S. Pat. No. 5,181,962 to Milburn L. Hart, issued Jan. 26, 1993.

The present invention comprises an inspection robot which traverses the interior of a pipeline which has an interior coating, while permitting a remote operator to view the interior of the pipeline and the operation of the inspection robot by means of simultaneous real-time video feedback and to control the inspection robot from the remote location.

The interior coating of a pipeline is not continuous (uniform) because it is done in two stages; as indicated heretofore, the pipe is laid in individual pieces or sections, pre-coated at the factory, and the uncoated ends of abutting individual pipes are subsequently welded together in the field, creating a pipeline having spaced apart, uncoated weld seams herein referred to as the field joints or weld seams, which must be coated in the field, as the second coating stage, after the welding process is complete.

The inspection robot is designed to check the integrity of the coating(s) applied principally to the field joints or weld seams. The inspection robot is provided with a brush made of conductive material such as copper strands which is mounted on an arm connected to a rotatable shaft and which may be positioned in a pipe such that the center of the brush corresponds directly with the field joint or weld seam with the sides of the conductive brush straddling the field joint or weld seam. The conductive brush, which constitutes a holiday detector, may be extended by means of an air cylinder contained within the arm and rotated by means the rotary shaft, causing the conductive brush to sweep against the coating at the field joint or weld seam. An electrical charge is imposed between the conductive brush and the pipe such that, in the even of a void or holiday in the field joint or weld seam coating, a spark will be emitted from the conductive brush.

When the conductive brush emits a spark, the spark will be sensed by a programmable logic controller (brain) mounted within a stationary drum. The controller will thereafter cause a holiday detector marker mounted adjacent the rotary brush to spray a circumferential mark on the pipe interior surface. Thereafter, the rotary shaft is rotated in the reverse direction, and the holiday detection marker will spray the pipe interior a second time at the location of the spark emitted by the conductive brush, thereby providing two circumferential marks each of which is located at the outermost point of the void or holiday on the weld seam. The space between the two marks is the location of the holiday or void in the pipe coating.

A mil gauge probe is mounted on a second arm connected to a rotatable hub intersecting the rotatable shaft and this second arm rotates simultaneously with the conductive brush, extending radially in an opposite direction from the arm on which the conductive brush is mounted. The mil gauge probe is provided with a slidable plunger which is adapted to sense the thickness of the interior pipe coating at various points along the field joint or weld seam. The mil gauge probe operates when the conductive brush is retracted.

The inspection robot is further provided with a drum which, as indicated heretofore, houses various components and controllers necessary to the operation of the inspection robot. A number of these components housed within the drum are commercially available devices. The rotatable shaft moves by means of a gear motor located within the drum. The gear motor drives the rotatable shaft through a sprocket drive. The rotatable shaft intersects the interior wall of the drum and extends perpendicularly outward therefrom, finally intersecting the rotatable hub to which the detection devices, including the conductive brush, holiday marker, and the slidable plunger operated mil gauge probe, are mounted. A digital mil gauge is housed within the drum and this digital mil gauge provides readable data when the slidable plunger operated mil gauge probe is extended and contacts the interior of the pipe.

Four video-type cameras are also mounted on the inspection robot. Two of the cameras are mounted on the rotatable hub. The first camera which is mounted on the rotatable hub permits the remote operator to supervise the operation of the mil gauge probe and plunger device which measures the thickness of the interior pipe coating. The second camera which is mounted on the rotatable hub is adapted to sense the position of the conductive brush such that the conductive brush may be repositioned directly over the field joint or weld seam by manual adjustment, and also the operation of detector marker and the marks provided thereby. The third camera mounted on the exterior of the drum is pointed in a forward direction and operates to detect field joints or weld seams for proper positioning of the inspection robot and movement to a subsequent field joint or weld seam. The fourth camera is mounted within the drum directly over the digital mil gauge to record digital mil gauge readings at any given point in time. The four cameras provide real time video feedback to an inspection robot operator located outside the pipeline, enabling the operator to check the proper operation and position of the elements involved in the inspection and where necessary to effectuate adjustments; the cameras also create visual recordings of the mil gauge readings and holiday detection markings for subsequent repair.

DETAILED DESCRIPTION OF THE PREFERRED EMBODIMENTS

Figure 1:
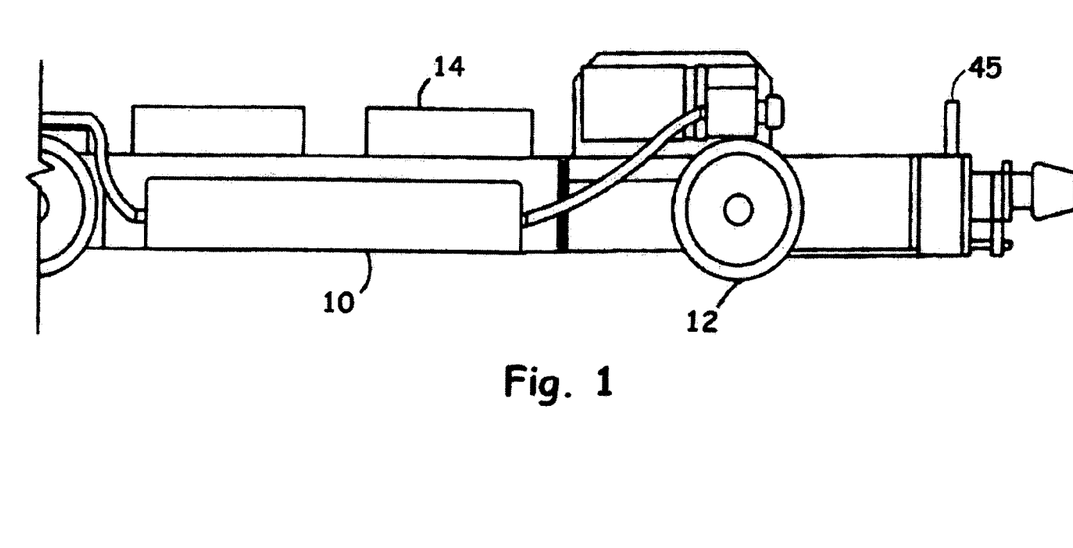
FIG. 1 is a longitudinally broken view constituting a side elevation of the inspection robot showing the full length of the robot and the point of attachment of the inspection robot to a crawler unit.
Figure 2:
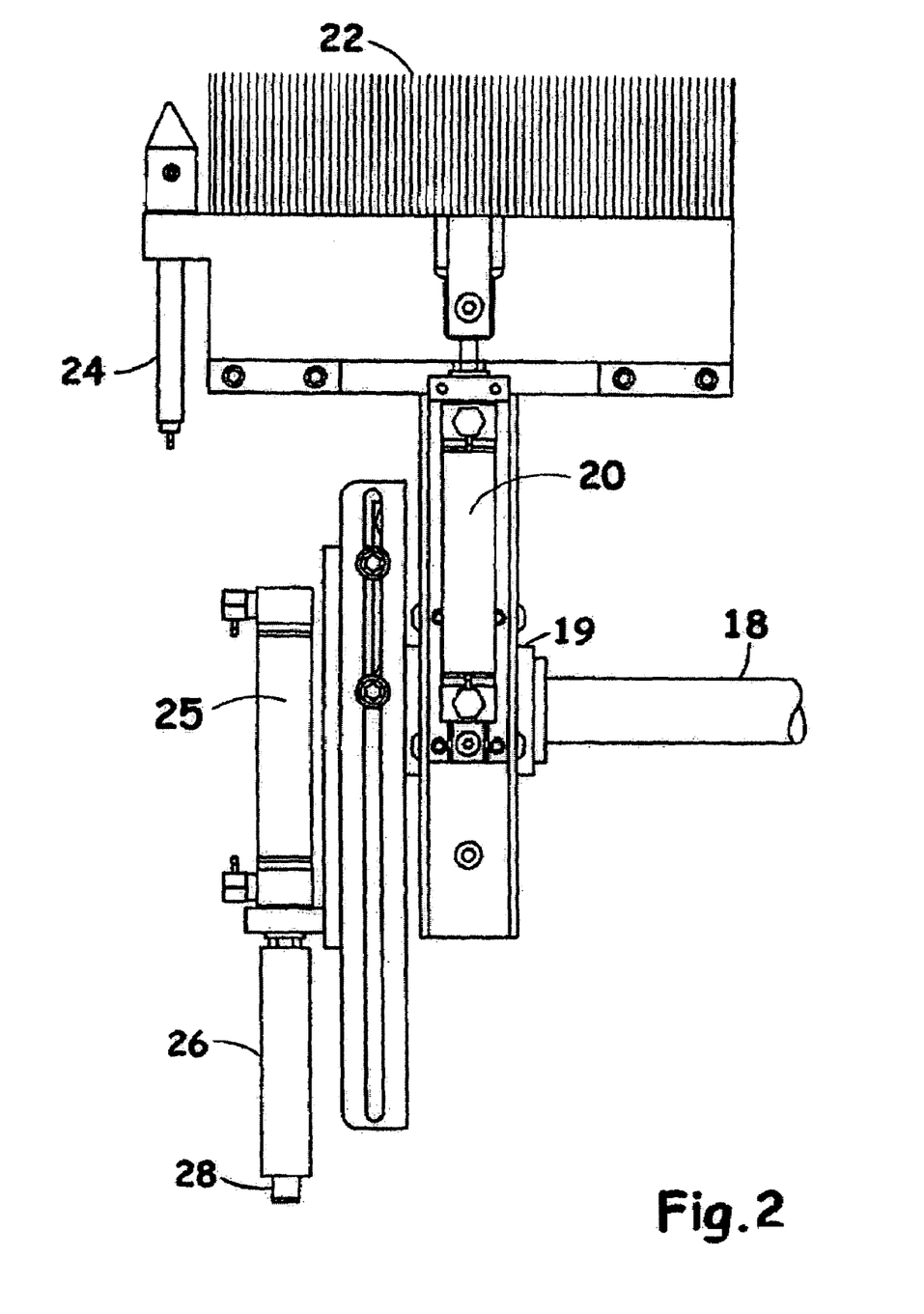
FIG. 2 is a side view, on a larger scale, of the front section of the inspection robot showing details of the holiday detector, the holiday marker and the mil gauge probe.
Figure 3:
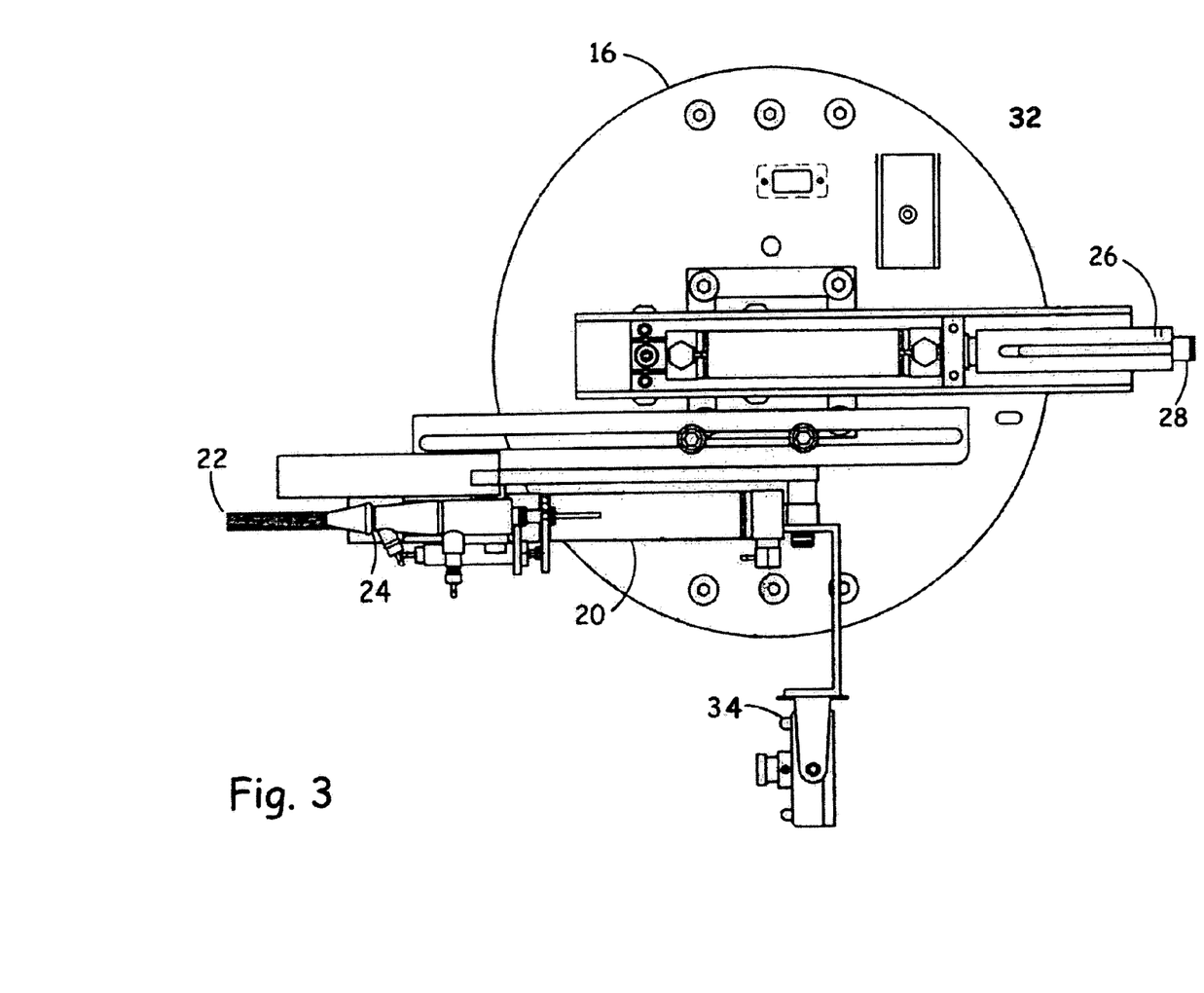
FIG. 3 is a left hand end view of the inspection robot taken from FIG. 2.
Figure 4:
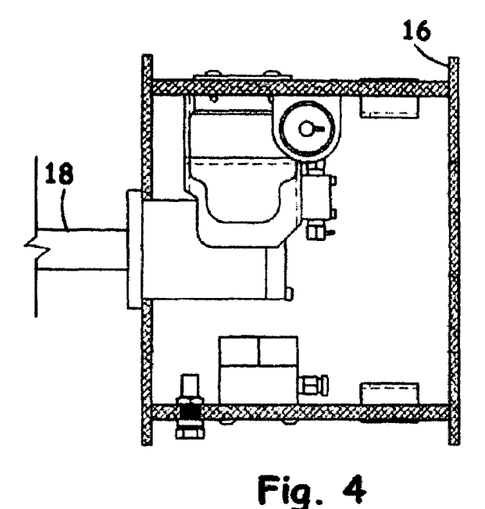
FIG. 4 is a sectional view of the cylindrical drum portion of the robot taken along section line 4—4 of FIG. 1.

Referring to the drawings in detail, FIG. 1 shows an inspection robot which consists essentially of a commercially available crawler (tractor) device 10 adapted to traverse the length of a pipeline (not shown) and an inspection machine 9 which attaches to the forward end 40 of the crawler. The crawler 10 is standard fitted with items such as wheels 12 to permit the crawler 10 to roll through the pipeline, a battery 14 to power various equipment on the inspection machine 9 and crawler 10 and a cable and wiring system (not shown) which facilitates operation of the various on-board equipment which will hereinafter be described.

The inspection machine 9 is provided with a non-rotatable drum 16 which supports a rotatable shaft 18 upon which the inspection unit portion of the machine 9 rotates or revolves. The shaft 18 connects with a hub 19 upon which a series of inspection components are mounted as will hereinafter appear. (See also FIGS. 2 through 6, inclusive.) The drive for the rotatable shaft (or tube) 18 will be further described as follows: A gear motor 39 (see FIG. 1) mounted within the stationary drum 16 drives a small sprocket 41 (see FIG. 6) which meshes with a chain 42. The chain 42 drives a larger sprocket 43 which is mounted on one end of the shaft 18.

As best shown in FIG. 1, the hub 19 has a top portion and a bottom portion thereon. Attached to the top portion of the hub is a perpendicularly extending air cylinder (leg) 20 on which a brush 22 is mounted. The brush 22 comprises conductive material, such as copper strands. As the shaft 18 rotates, it causes the hub 19 to rotate the conductive brush 22 which sweeps against the surface of a field joint or seam weld along the interior of a pipeline (not shown). When the conductive brush 22 contacts an uncoated portion (holiday) on the field joint or seam weld, a spark is emitted. A holiday marker 24 is mounted adjacent the conductive brush 22 and when a void or holiday is detected by the conductive brush 22 and a spark is emitted, the holiday marker 24 sprays paint on the surface of the pipe so as to mark the location of the holiday. The assembly is then rotated in the opposite direction and the holiday marker 24 marks the spark location from this opposite direction, thereby indicating the two endpoints of the void or holiday in the coating on the field joint or seam weld. A camera 34 is also mounted to the top portion of the hub 19 and positioned such that lens of the camera 34 "sees" the sweeping of the conductive brush 22 and the marking of the holiday marker 24 and can provide real-time video feedback to an operator at a remote location as well as recording the location of the void or holiday for future repair.

Connected to the bottom portion of the hub 19 is a slideable plunger device 26 which houses a mil gauge probe 28. A digital mil gauge 38 is located within the interior of the drum 16 and provides a digital readout of the data taken by the mil gauge probe 28. As the shaft 18 turns the hub 19 and the attachments thereto, around the circumference of the field joint or seam weld, the slideable plunger 26 is actuated automatically every quarter revolution by air cylinder 25 to cause the mil gauge probe 28 to extend against the interior wall of the pipeline at which time the mil gauge probe 28 will read the coating thickness on the interior wall of the pipeline, the results of which reading will appear on the digital mil gauge 38. A camera 36 is positioned inside the non-rotatable drum 16 directly above the digital mil gauge 38, which camera records the readings shown on the digital mil gauge 38 and provides real-time video to a remote operator (not shown).

The inspection machine 9 is further provided with three additional cameras as follows. A second camera 32 (see FIGS. 1, 3 and 5) is located on the forward facing portion of the drum 16 such that the camera 32 is positioned to view the length of the pipeline to enable a remote operator to "see" down the pipeline for the purpose of guiding the crawler 10 as it moves longitudinally down the pipeline. A third camera 34 is located on the top portion of the hub 19 (see FIG. 1) and facing the conductive brush 22 such that, as the shaft 18 turns and causes the conductive brush 22 to sweep against the field joint or seam weld on the pipe interior, the third camera 34 records the sweep and provides real-time video for the remote operator. The third camera 34 also provides a visual record of any marks made by the holiday marker 24 when a void or holiday is detected by the conductive brush 22. The fourth camera 30 is mounted on the bottom portion of the hub 19 and positioned to view the slideable plunger 26 and mil gauge 28 such that the movements and readings of the mil gauge 28 are digitally recorded and may be monitored by a remote operator.

Figure 5:
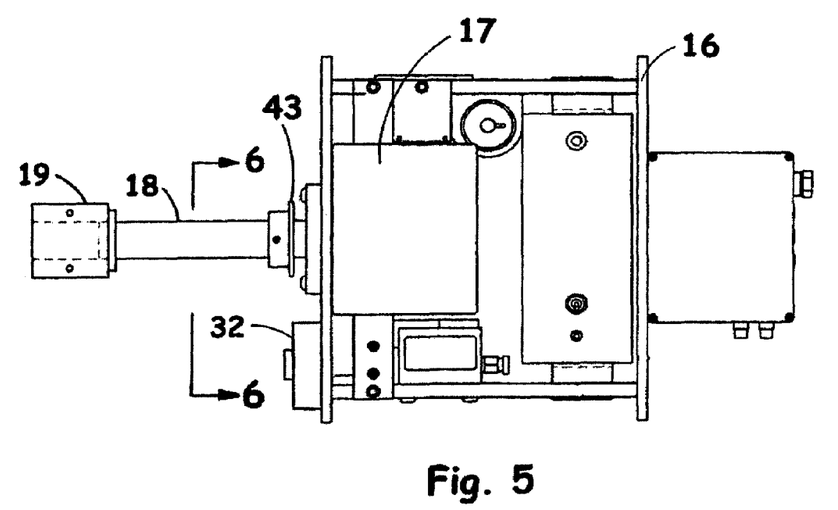
FIG. 5 is a top view of the cylindrical drum portion of the robot, taken along line 5—5, showing a video device attached to the forward portion of the cylindrical drum, the rotatable shaft member and the hub unit (shown without attachments).
Figure 6:
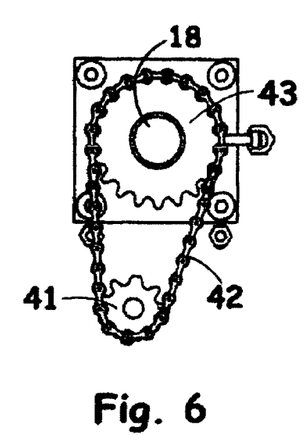
FIG. 6 is a front view of chain drive for the rotatable shaft.
Figure 7:
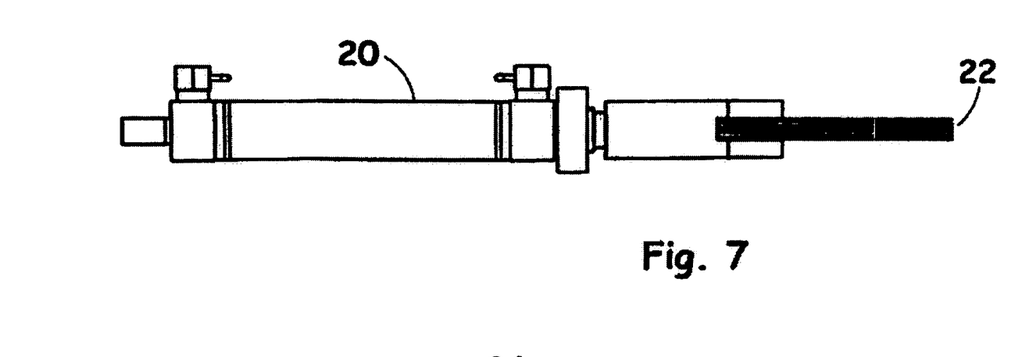
FIG. 7 is a side elevation of the conductive brush unit mounted on an air cylinder.
Figure 8:
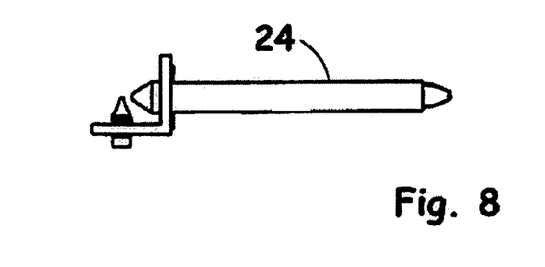
FIG. 8 is a side elevation of the holiday marker
Figure 9:
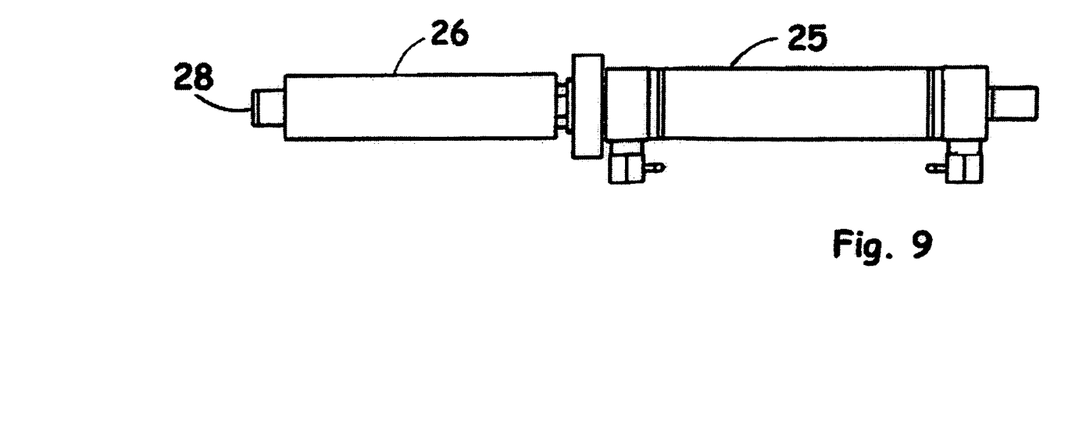
FIG. 9 is a side elevation of the mil gauge probe mounted on an air cylinder.

Referring now to FIG. 5, the stationary drum 16 houses a programmable logic controller (brain) 17 which contains all of the electronic circuitry (not shown) for operating all of the electrical and pneumatic components utilized in the inspection machine 9. For example, when the probe 28 contacts the interior surface of the pipeline (not shown), the probe 28 sends a signal to the digital mil gauge 38 such that the digital readout displays a numerical measurement of the coating thickness. Likewise when the holiday detector 22 emits a spark, the latter information is fed to the controller 17 to cause the marker 24 to be actuated. The controller (brain) 17 also determines the sweep of the brush 22 in both rotary directions; and the actuation of the air cylinder 20 to place the brush into and out of contact with the pipe. The controller 17 automatically determines the actuation of the probe 28 every quarter turn of shaft 18. All of these devices connect to or through the controller 17.

Operation of the Robot

Figure 10:
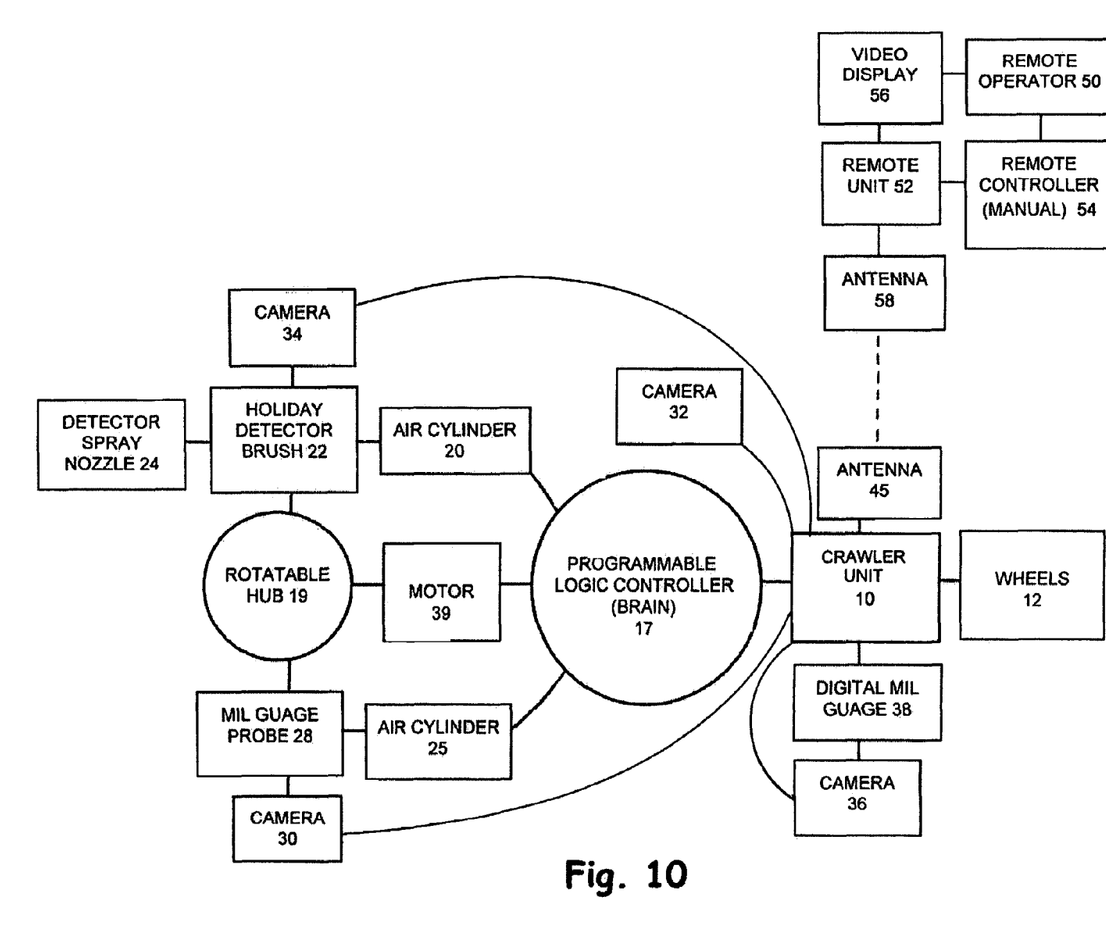
FIG. 10 is a block diagram showing the interrelation of the various components mounted on the robot as well as the components mounted at the remote unit.

The crawler 10 is put into the pipeline (not shown) and the wheels 12 are actuated to have the robot go down the pipe to the first weld joint. The manner in which this is accomplished is by conventional radio telemetry. A sending and receiving antenna 45 is mounted on the crawler (FIG. 1) and a remote operator 50 (see now FIG. 10) is provided with remote control unit 52 exterior of the pipeline having thereon a sending and receiving antenna 58 which is in communication with the antenna on the robot. The remote operator outside the pipe presses a button on the remote controller 54 which stops the crawler 10. The remote operator also has a video receiver 56 which is selectively in communication with each of the four cameras as determined by the remote controller 54. When the robot is first going down the pipeline the remote operator will be looking down the pipeline through the camera 32. When he gets to a point adjacent the location of the weld joint to be inspected by the inspection machine 9 he will be looking through the camera 34.

It should be understood that there are individual markings inside the pipeline which serve to distinguish one pipeline joint from the other. The operator watches for these distinguishing marks through cameras 32 and 34. If the brush 22 is not precisely over the weld joint, the operator can use his remote controller 54 to jog the robot in one direction or the other until the brush 22 is properly aligned with the weld joint. At this time the operator engages another button which starts the automatic features of the internal controller 17 to operate the various instrumentalities of the robot. For example, the air cylinder 20 is actuated to move the brush 22 against the weld joint. Thereafter, the brush 22 will be swept around the circumference of the weld joint by the rotation of the shaft 18, all automatically controlled by the controller 17. If the holiday detector 22 should detect a holiday, then the operation of the brush 22 will be controlled in a slightly different manner i.e., the brush 22 will be caused to rotate in an opposite rotary direction while the holiday marker device will spray a circumferencial line on the interior of the pipeline in both rotary movements of the brush so as to accurately locate the holiday. After the holiday detection operation is completed, the controller 17 will automatically rotate the shaft 18 through successive one quarter revolutions at which time the thickness gauge probe 28 will be extended against the inner surface of the pipeline to provide a reading of the coating thickness.

Whereas all of these motions are set forth in automatic sequence through the controller 17, the remote operator can, nevertheless, duplicate individual operations of the various components such as the holiday detection or the reading of the thickness of the coating. The operator can override the automatic feature of the robot.

All the time that the foregoing is going on the various cameras are recording what is seen by the sweep of the brush 22 and the gauge probe 28.

Whereas the present invention has been described in particular relation to the drawings attached hereto, it should be understood that other and further modifications, apart from those shown or suggested herein, may be made within the spirit and scope of this invention.

What is claimed is:

1. An inspection robot adapted to traverse the interior of a pipeline for the purpose of checking the coating at the interior surface of the pipeline at the weld seams thereon to determine the thickness of the coatings and for detecting for voids or holidays by means of a conductive brush that sweeps against the weld seam and emits a spark when a void is encountered, the spark emission causing a holiday marker to activate and mark the pipeline interior surface so that the site can be revisited for repair, a mil gauge probe mounted on a slideable plunger for measuring coating thickness on the weld seam and providing data via a digital mil gauge readout, the conductive brush, the slideable plunger for the mil gauge probe, the digital mil gauge readout, and a forward portion of the robot all being provided with cameras which simultaneously monitor the movements and data encountered by the inspection robot to provide real-time feedback to a remote operator, wherein the holiday marker is a spray unit located adjacent the conductive brush such that when the conductive brush emits a spark, the spray unit will be actuated to place a circumferential mark on the inner circumference of the pipeline adjacent the weld seam and wherein the actuation of the spray unit will cause the brush to rotate in a reverse direction against the inside of the pipeline following which the holiday marker will again be actuated to spray a second circumferential mark on the interior of the pipeline adjacent to the weld seam.

2. An inspection robot adapted to traverse the interior of a pipeline for the purpose of checking the coating at the interior surface of the pipeline at the weld seams thereon to determine the thickness of the coatings and for detecting for voids or holidays by means of a conductive brush that sweeps against the weld seam and emits a spark when a void is encountered, the spark emission causing a holiday marker to activate and mark the pipeline interior surface so that the site can be revisited for repair, a mil gauge probe mounted on a slideable plunger for measuring coating thickness on the weld seam and providing data via a digital mil gauge readout, the conductive brush, the slideable plunger for the mil gauge probe, the digital mil gauge readout, and a forward portion of the robot all being provided with cameras which simultaneously monitor the movements and data encountered by the inspection robot to provide real-time feedback to a remote operator, wherein the conductive brush is mounted on an air cylinder and wherein a signal to the air cylinder will cause the brush to move against the interior surface of the pipeline at the weld seam.

3. An inspection robot as set forth in claim 2 wherein the conductive brush is retracted from contact with the interior surface of the pipeline and wherein the slidable plunger is actuated thereafter to cause the mil gauge probe to move against the interior surface fo the pipe and then retract.

4. An inspection robot adapted to traverse the interior of a pipeline for the purpose of checking the coating at the interior surface of the pipeline at the weld seams thereon to determine the thickness of the coatings and for detecting for voids or holidays by means of a conductive brush that sweeps against the weld seam and emits a spark when a void is encountered, the spark emission causing a holiday marker to activate and mark the pipeline interior surface so that the site can be revisited for repair, a mil gauge probe mounted on a slideable plunger for measuring coating thickness on the weld seam and providing data via a digital mil gauge readout, the conductive brush, the slidable plunger for the mil gauge probe, the digital mil gauge readout, and a forward portion of the robot all being provided with cameras which simultaneously monitor the movements and data encountered by the inspection robot to provide real-time feedback to a remote operator, wherein the robot is provided with an antenna capable of transmitting information concerning the cameras and operation of the holiday detector and the mil gauge probe to a remote antenna mounted on a remote unit and in communication with the antenna on the robot, the remote unit being operated by a remote operator having a remote controller and a video display whereby the remote operator can actuate the inspection robot to perform any of the functions performed by the inspection robot.

5. An inspection robot as set forth in claim 4 wherein the inspection robot is mounted on motorized wheels for moving the robot longitudinally down the pipeline and wherein the remote operator, through the remote controller can cause the inspection robot to move down the pipe while the remote operator guides the movements through one or more of the cameras provided.

* * * * *